(12) United States Patent
Allen et al.

(10) Patent No.: US 8,051,826 B2
(45) Date of Patent: Nov. 8, 2011

(54) INJECTION SYSTEM FOR AN INTERNAL COMBUSTION ENGINE

(75) Inventors: Jeffrey Allen, Attleborough (GB); Paul Bartholomew Ravenhill, Dereham (GB); Steven Barraclough, Wymondham (GB)

(73) Assignee: Scion-Sprays Limited, Hethel Engineering Centre, Hethel, Norwich, Norfolk (GB)

( * ) Notice: Subject to any disclaimer, the term of this patent is extended or adjusted under 35 U.S.C. 154(b) by 588 days.

(21) Appl. No.: 12/038,214

(22) Filed: Feb. 27, 2008

(65) Prior Publication Data

US 2008/0202465 A1    Aug. 28, 2008

(30) Foreign Application Priority Data

Feb. 28, 2007   (GB) ................................. 0703878.9

(51) Int. Cl.
*F01M 1/16* (2006.01)
(52) U.S. Cl. ............. 123/196 R; 123/90.33; 123/73 AD
(58) Field of Classification Search ............. 123/73 AD, 123/90.33–90.38, 196 R, 196 M, 196 CP
See application file for complete search history.

(56) References Cited

U.S. PATENT DOCUMENTS

| | | | | |
|---|---|---|---|---|
| 4,653,455 A | | 3/1987 | Eblen et al. | |
| 5,287,833 A | | 2/1994 | Yashiro | |
| 5,375,573 A | * | 12/1994 | Bowman | 123/196 R |
| 5,390,635 A | * | 2/1995 | Kidera et al. | 123/196 R |
| 5,537,959 A | * | 7/1996 | Ito | 123/73 AD |
| 5,630,383 A | | 5/1997 | Kidera et al. | |
| 5,829,401 A | * | 11/1998 | Masuda | 123/179.25 |
| 6,209,315 B1 | | 4/2001 | Weigl | |
| 6,354,079 B1 | | 3/2002 | Choi et al. | |
| 6,374,781 B1 | * | 4/2002 | Kato | 123/73 AD |
| 6,422,183 B1 | * | 7/2002 | Kato | 123/73 AD |
| 6,516,607 B1 | | 2/2003 | Bruck et al. | |
| 6,516,756 B1 | * | 2/2003 | Kato et al. | 123/73 AD |
| 6,863,036 B2 | * | 3/2005 | Kato | 123/73 AD |
| 6,904,879 B2 | * | 6/2005 | Kato | 123/73 AD |
| 6,964,254 B1 | * | 11/2005 | Koerner et al. | 123/196 R |
| 6,973,908 B2 | * | 12/2005 | Paro | 123/196 R |
| 7,007,656 B2 | * | 3/2006 | Fujino | 123/196 R |
| 7,150,249 B2 | * | 12/2006 | Kato | 123/73 AD |
| 2003/0213649 A1 | | 11/2003 | Kato | |
| 2004/0129237 A1 | * | 7/2004 | Kato | 123/73 AD |

FOREIGN PATENT DOCUMENTS

GB    2363084 A    12/2001

(Continued)

OTHER PUBLICATIONS

Patent Act 1977, Combined Search and Examination Report under Section 17 and 18(4) Application No. GB0803607.1.

(Continued)

*Primary Examiner* — Erick Solis
(74) *Attorney, Agent, or Firm* — Luedeka, Neely & Graham, P.C.

(57) ABSTRACT

The present invention relates to an internal combustion engine having an injector which functions as a positive displacement pump and dispenses an amount of lubricant fixed for each and every operation of the injector. The fluid dispensed could be a lubricant delivered directly to crankshaft bearings, camshaft bearings, tappets or cylinder sleeve. Alternatively the fluid could be fuel, water or urea delivered to an exhaust system upstream of a catalytic converter. The injector can have a one-way valve with a valve element having a domed or conical surface for directing fluid flow across a sharp edge which induces turbulence in the fluid flow.

23 Claims, 14 Drawing Sheets

FOREIGN PATENT DOCUMENTS

| | | | |
|---|---|---|---|
| GB | 2421543 | A | 6/2006 |
| WO | 0021881 | A | 4/2000 |
| WO | 0028194 | A1 | 5/2000 |
| WO | 2004038189 | A1 | 5/2004 |
| WO | 2007017627 | A2 | 2/2007 |

OTHER PUBLICATIONS

Patents Act 1977: Combined Search and Examination Report under Sections 17 and 18(30 Application No. GB0703878.9 dated May 14, 2007.

European Examination Report, Communication pursuant to Article 94(3) EPC Application No. 08 709 546.9—2311, dated Oct. 27, 2010, Scion-Sprays Limited 3 pages.

Response to European Examination Report Application No. 08 709 546.9, dated Jan. 7, 2011, Scion-Sprays Limited 8 pages.

Chinese Office Action, Application No. 200880006497.0, Scion-Sprays Limited dated May 5, 2011, A Control System for a Lubrication System in an Internal Combustion Engine 7 pages.

\* cited by examiner

INJECTION SYSTEM FOR AN INTERNAL COMBUSTION ENGINE

The present invention relates to an injection system for an internal combustion engine.

In the applicant's previous patent application GB2421543, the applicant described "pulse count injection", a system where an injector of the type shown as 10 in FIG. 1 of the drawings of this application is used to deliver gasoline fuel for combustion in an internal combustion engine. The amount of fuel delivered in each operating cycle of the engine is controlled by the number of pulses of fuel delivered by the injector in the operating cycle. In each operation the injector unit delivers a set quantity of fuel, i.e. the amount of fuel delivered by the injector is fixed for each and every operation of the injector.

The injector functions as a positive displacement pump and comprises a fuel inlet 11, a fuel outlet 12, a piston 13 and a solenoid 14. A one-way inlet valve 16 is provided in the piston 13 and a one-way outlet valve 17 is provided to control flow of fuel to the fuel outlet 12. A fuel chamber 18 is defined between the piston 13 and its surrounding housing 19. A biasing spring 20 biases the piston to move in a direction which increase the volume of the fuel chamber 18.

During operation, as the volume of the fuel chamber 18 is increased, then the one-way inlet valve 16 opens to allow fuel to be introduced into the fuel chamber 18. Then when the solenoid 14 is activated and the piston 13 moves upwardly against the action of the piston spring 20, the fuel in the fuel chamber 18 is expelled to the fuel outlet 12 via the outlet one-way valve 17. The piston 13 is moveable between two fixed end stops so that its travel is consistent in each stroke and therefore the volume of fuel delivered in each operation is fixed. The injector pump could be reversed to work with the piston driven under action of the electrical coil to draw fuel into the fuel chamber and then driven by the spring to force fuel out of the fuel chamber.

In a first aspect the present invention provides an internal combustion engine having a lubrication system which comprises:

a reservoir of lubricant;

an injector which functions as a positive displacement pump, which is connected to the reservoir of lubricant and which dispenses an amount of lubricant which is fixed for each and every operation of the injector; and an electronic controller which controls operation of the injector; wherein:

the controller controls delivery of lubricant by the injector and controls how many times the injector dispenses lubricant in each engine cycle and timing of delivery of lubricant in each engine cycle of the injector, the controller increasing in number the operations per cycle of the injector with increasing engine speed and/or load and the controller decreasing in number the operations per cycle of the injector with decreasing engine speed and/or load.

In a second aspect, the present invention provides an internal combustion engine comprising:

a piston reciprocating in a cylinder;

a crankshaft journalled in bearings;

a connecting rod connecting the piston to the crankshaft; and a lubrication system for lubricating the bearings which comprises:

a reservoir of lubricant;

an injector which functions as a positive displacement pump, which is connected to the reservoir of lubricant and which dispenses an amount of lubricant which is fixed for each and every operation of the injector; and an electronic controller which controls operation of the injector; wherein:

the controller controls delivery of lubricant by the injector and controls how many times the injector dispenses lubricant in each engine cycle and timing of delivery of lubricant in each engine cycle of the injector, the controller increasing in number the operations per cycle of the injector with increasing engine speed and/or load and the controller decreasing in number the operations per cycle of the injector with decreasing engine speed and/or load.

In a third aspect the present invention provides an internal combustion engine comprising:

a piston reciprocating in a cylinder;

a connecting rod connecting the piston to the crankshaft; and a lubrication system for lubricating a wall of the cylinder which comprises:

a reservoir of lubricant;

an injector which lubricates a wall of the cylinder, which functions as a positive displacement pump, which is connected to the reservoir of lubricant and which dispenses an amount of lubricant which is fixed for each and every operation of the injector; and an electronic controller which controls operation of the injector; wherein:

the controller controls how many times the injector dispenses lubricant in each engine cycle and also timing of delivery of lubricant by the injector, the controller increasing in number the operations of the injector per engine cycle with increasing engine speed and/or load and the controller decreasing in number the operations of the injector per engine cycle with decreasing engine speed and/or load.

In a fourth aspect, the present invention provides an internal combustion engine comprising:

a reservoir for storing fluid;

an exhaust system leading combusted gases from one or more combustion chambers of the engine to atmosphere via a catalytic converter; and a fluid delivery system for delivering the fluid to the exhaust system for mixing with the combusted gases upstream of the catalytic converter; wherein the fluid delivery system comprises:

an injector which functions as a positive displacement pump, which is connected to the reservoir of fluid and which dispenses an amount of fluid which is fixed for each and every operation of the injector; and an electronic controller which controls operation of the injector; wherein:

the controller controls how many times the injector dispenses fluid in each engine cycle and timing of the dispensing of fluid.

In a fifth aspect the present invention provides an internal combustion engine comprising:

a combustion chamber;

an air intake system for delivering charge air to the combustion chamber;

an exhaust system for relaying combusted gas from the combustion chamber to atmosphere; and a fuel injection system for delivering fuel into the charge air to form a fuel/air mixture which is subsequently combusted in the combustion chamber;

wherein the fuel injection system comprises:

an injector which functions as a positive displacement pump and dispenses an amount of fuel fixed for each and every operation of the injector; and a controller which controls the operation of the fuel injector;

wherein the injector comprises:

a housing in which a variable volume chamber is formed;

an electrical coil;

a piston which slides axially in a bore in the housing under the action of the electrical coil;

a one-way inlet valve which allows flow of fuel into the variable volume chamber from a fluid inlet; and a one-way outlet valve which allows flow of fuel out of the variable volume chamber to a fluid outlet; wherein:

the inlet valve is located within a valve chamber provided in the piston and controls flow of fuel through a piston passage passing through the piston;

the inlet valve has a movable element slidable along an axis in the valve chamber;

the piston passage has an inlet duct which delivers fluid to the valve chamber and a plurality of outlet ducts which deliver fluid from the chamber;

the movable element of the inlet valve has a domed or conical inlet face facing the inlet duct, an outlet face facing the outlet duct and a sharp edge for inducing turbulence in fluid flow past the movable element; and fuel flowing from the inlet duct to the outlet duct flows radially across the domed or conical inlet face of the movable element and past the sharp edge.

In a sixth aspect the present invention provides an internal combustion engine comprising:

a combustion chamber;

an air intake system for delivering charge air to the combustion chamber;

an exhaust system for relaying combusted gas from the combustion chamber to atmosphere; and a fuel injection system for delivering fuel into the charge air to form a fuel/air mixture which is subsequently combusted in the combustion chamber;

wherein the fuel injection system comprises:

an injector which functions as a positive displacement pump and dispenses an amount of fuel fixed for each and every operation of the injector; and a controller which controls the operation of the fuel injector;

wherein the injector comprises:

a housing in which a variable volume chamber is formed;

an electrical coil;

a piston which slides axially in a bore in the housing under the action of the electrical coil;

a one-way inlet valve which allows flow of fuel into the variable volume chamber from a fluid inlet; and a one-way outlet valve which allows flow of fuel out of the variable volume chamber to a fluid outlet; wherein:

the inlet valve is located within the variable volume chamber and controls flow of fuel out of a piston passage passing through the piston;

the inlet valve has a movable element located in the variable volume chamber;

the piston passage has a fluid outlet which delivers fluid to the variable volume chamber;

the movable element of the inlet valve has a domed or conical inlet face facing the fluid outlet of the piston passage and a sharp edge for inducing turbulence in fluid flow past the movable element;

the movable element is biased by a biasing spring into engagement with a valve seat on the piston surrounding the fluid outlet of the piston passage, the valve seat matching in shape the inlet face of the movable element; and fuel flowing from the inlet duct to the outlet duct must flow across the domed or conical inlet face of the movable element and past the sharp edge.

Preferred embodiments of the present invention will now be described with reference to the accompanying drawings, in which:

FIG. 2b is a schematic perspective view of the bearing of FIG. 2a;

Figure 1:
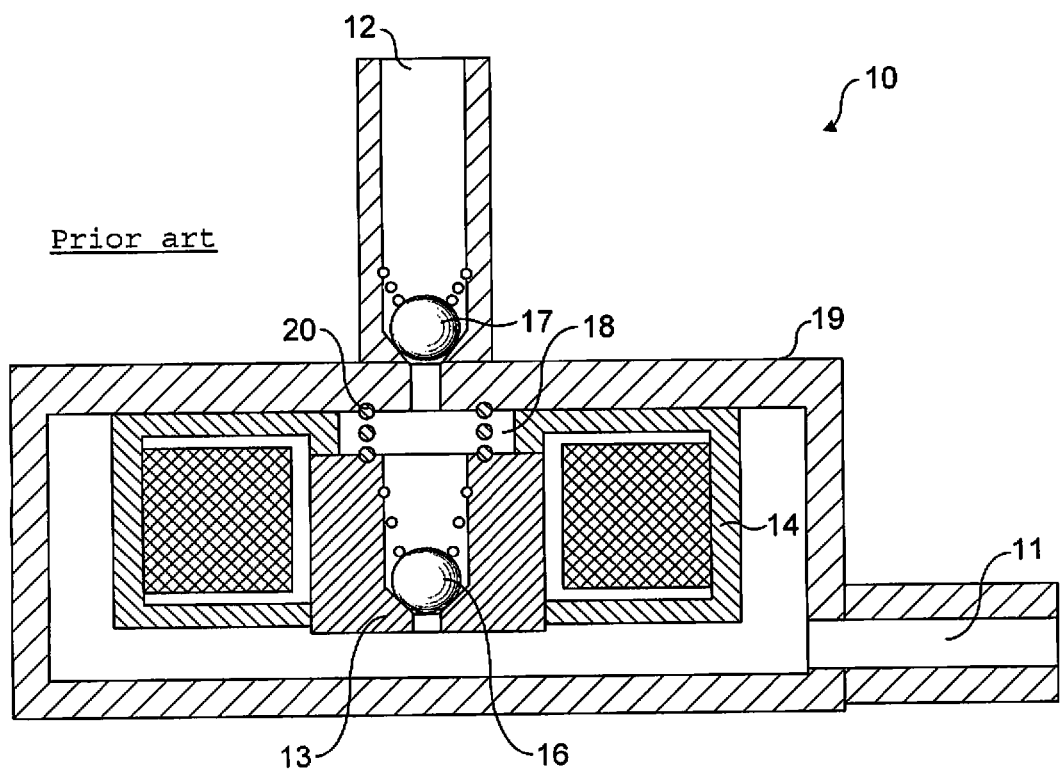
FIG. 1 is a cross-sectional view through a known injector of the applicant.
Figure 2:
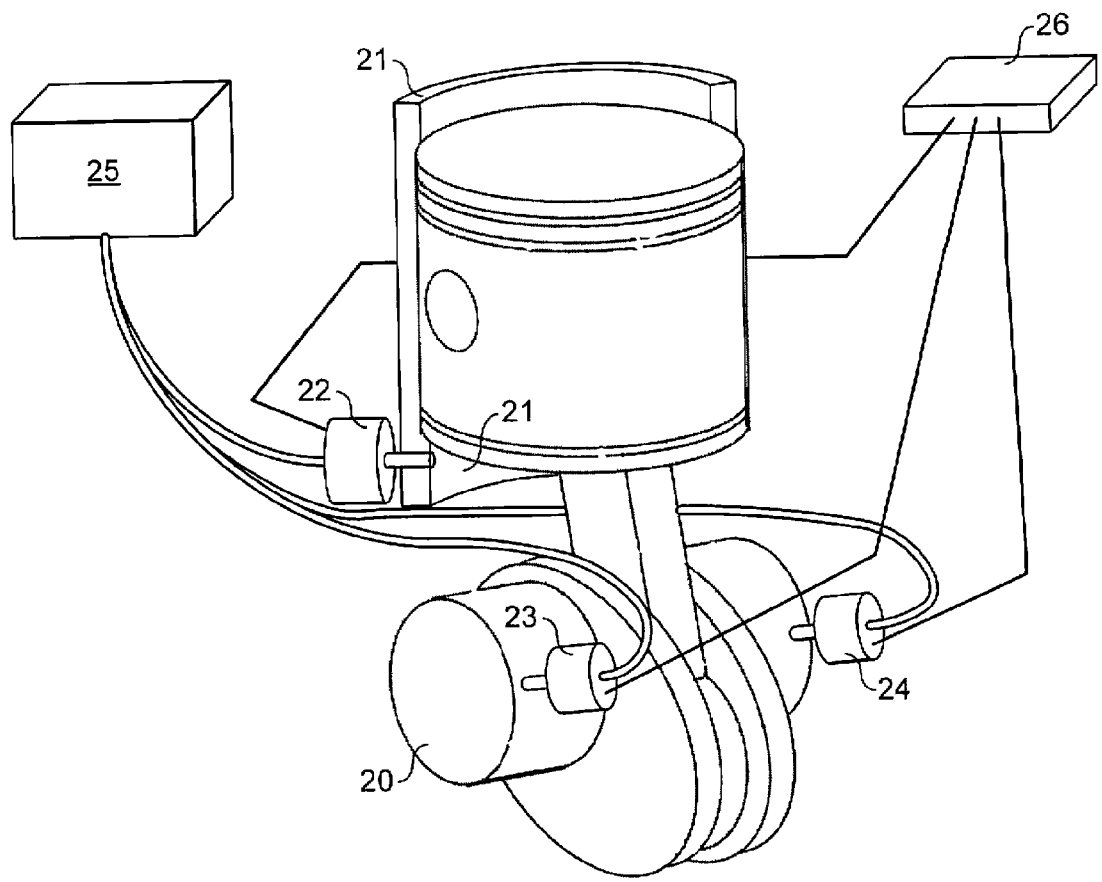
FIG. 2 shows the use of injectors of the type shown in FIG. 1 to deliver lubricating oil in a two-stroke engine.
Figure 3:
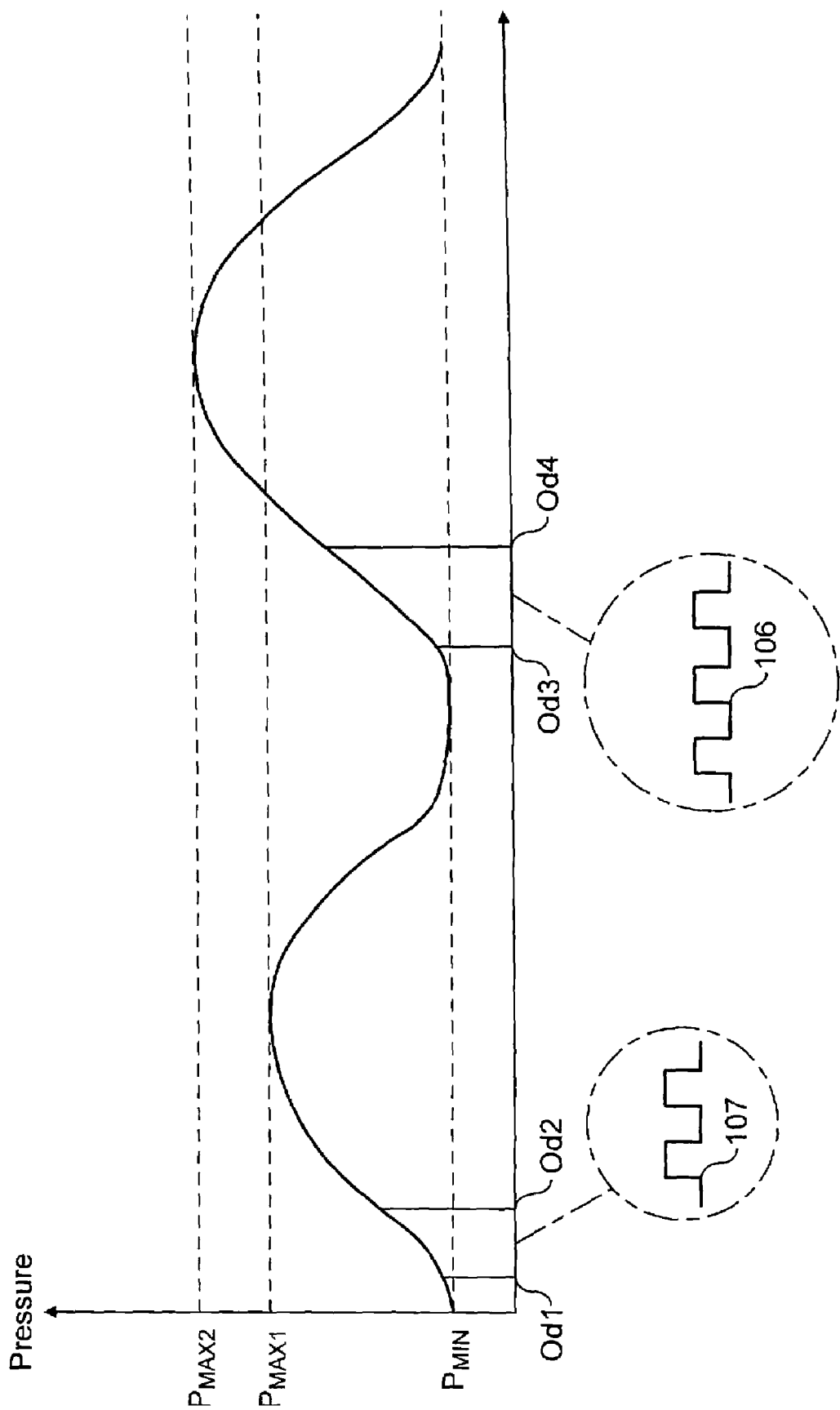
Figure 5:
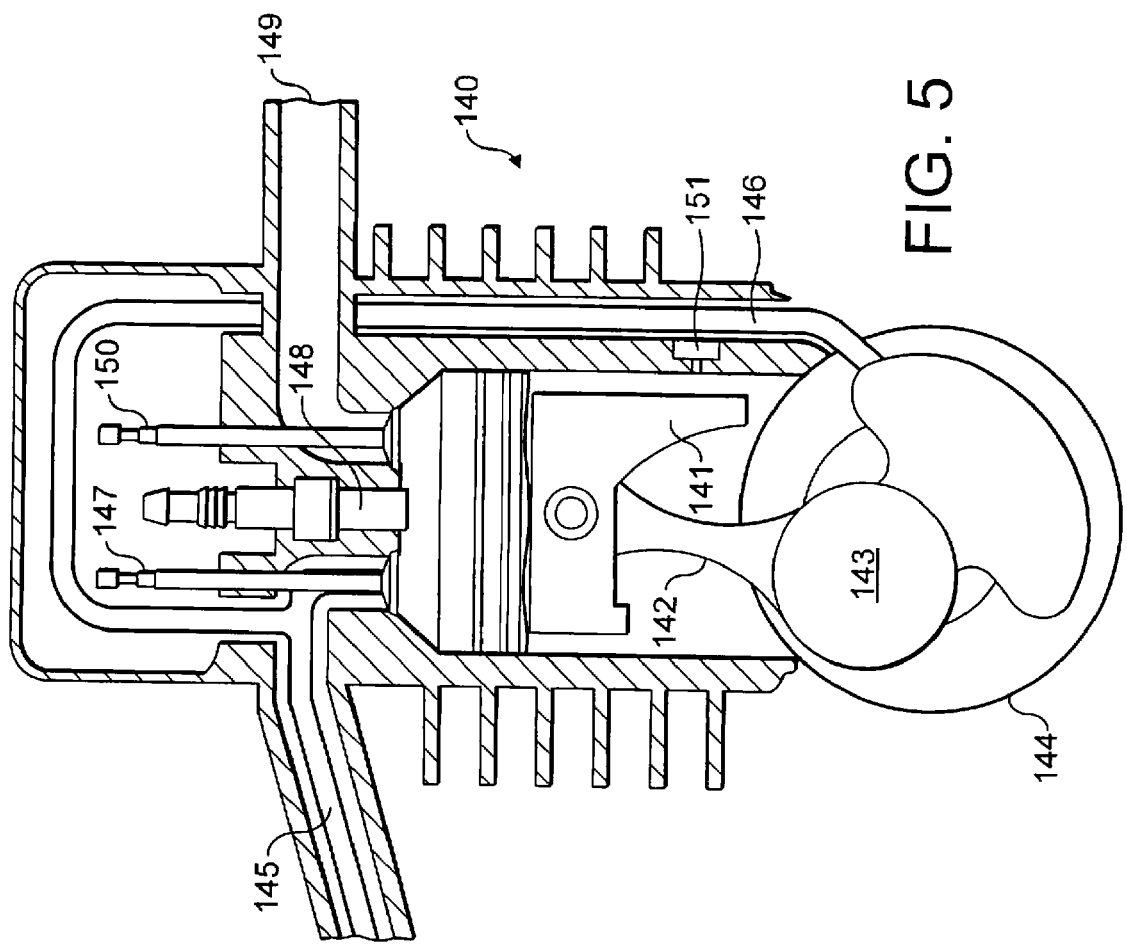
Figure 4:
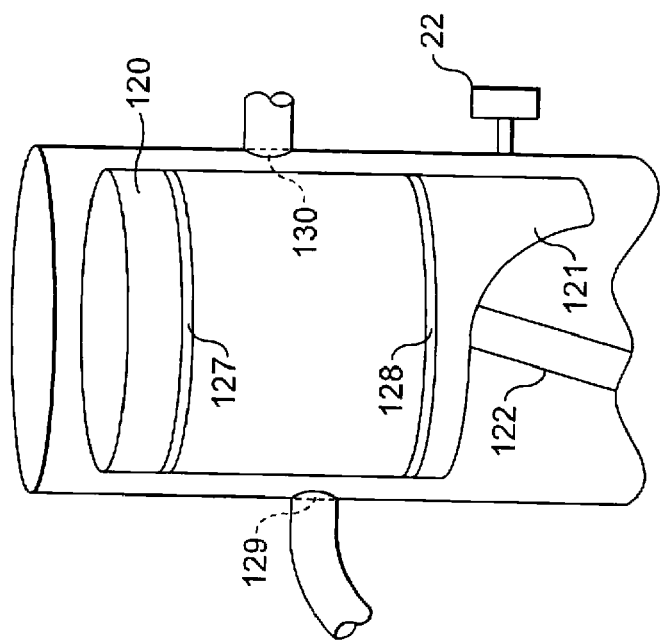
Figure 6:
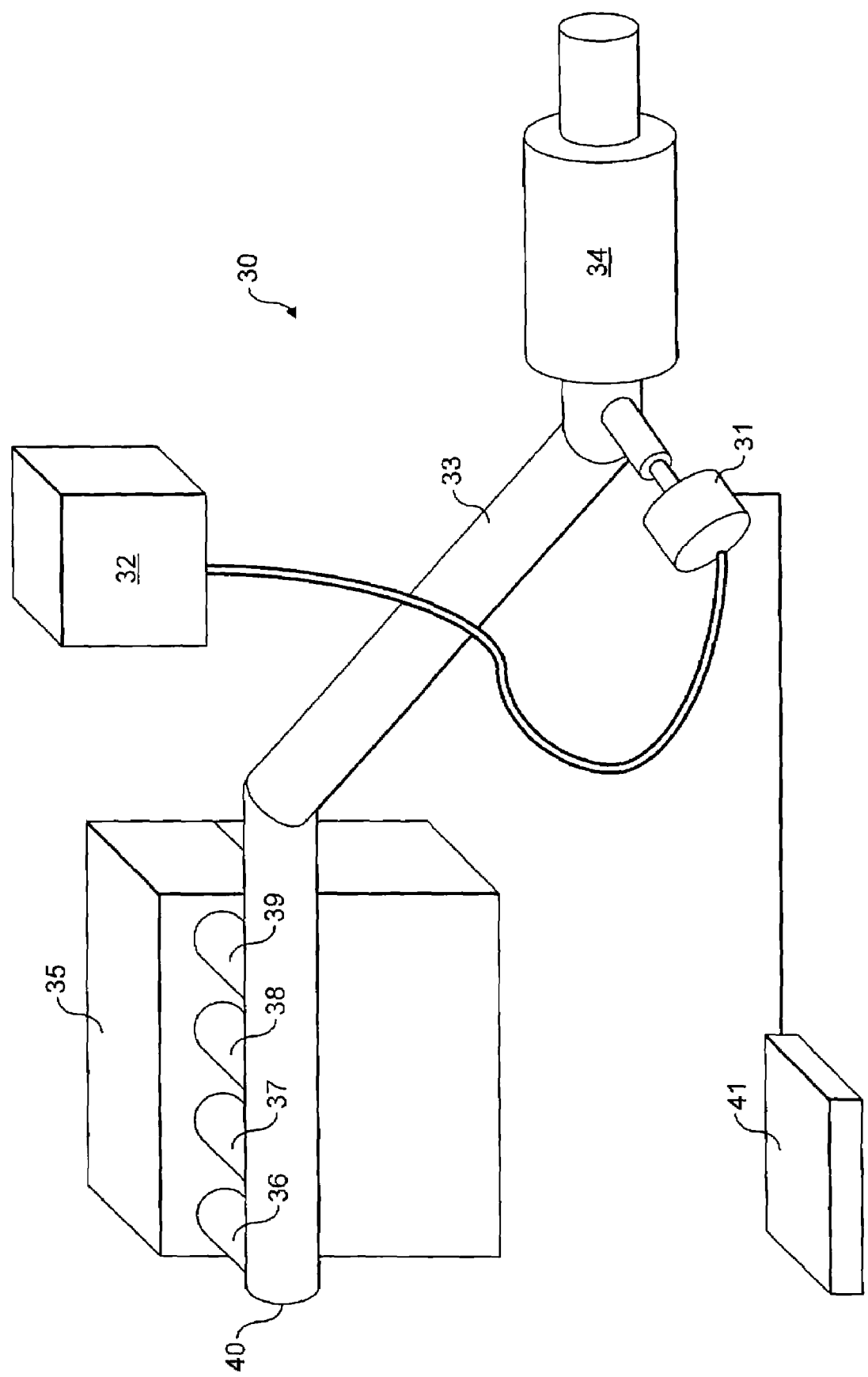
Figure 7A:
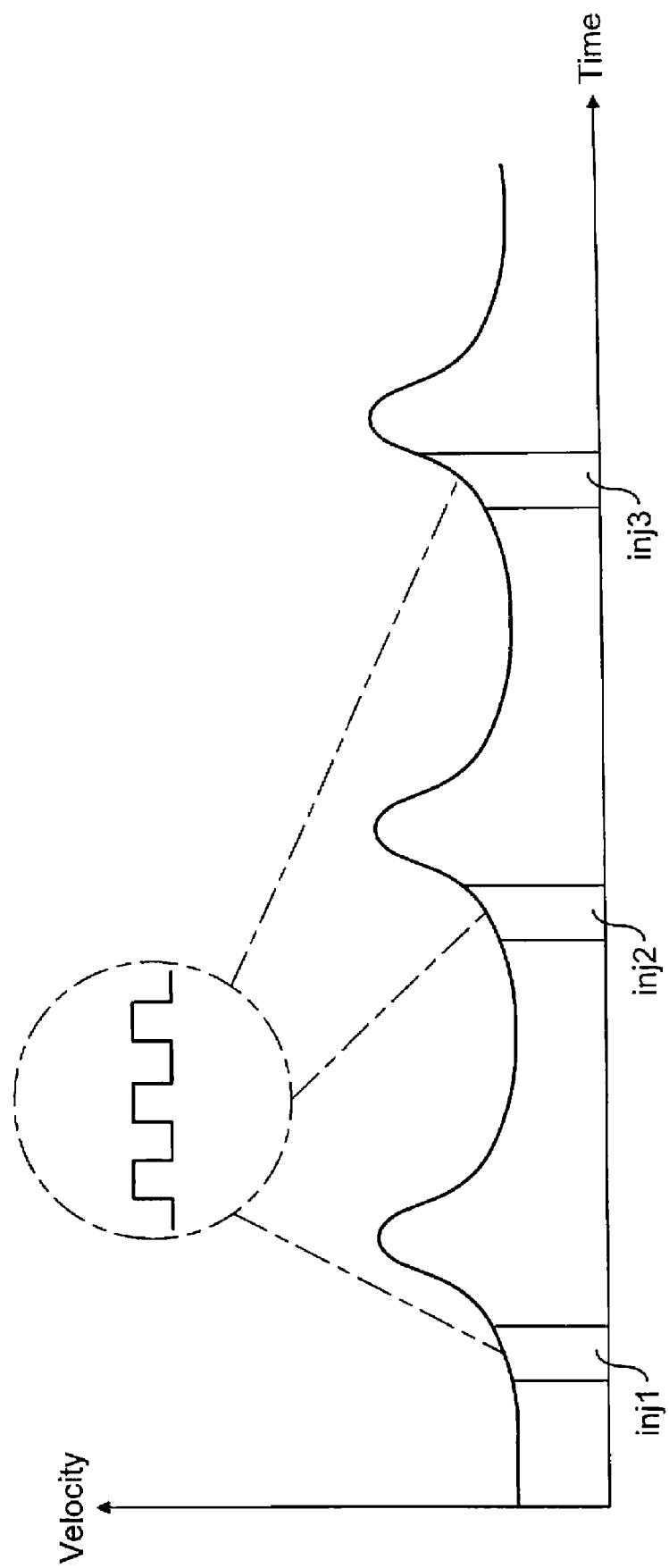
Figure 7B:
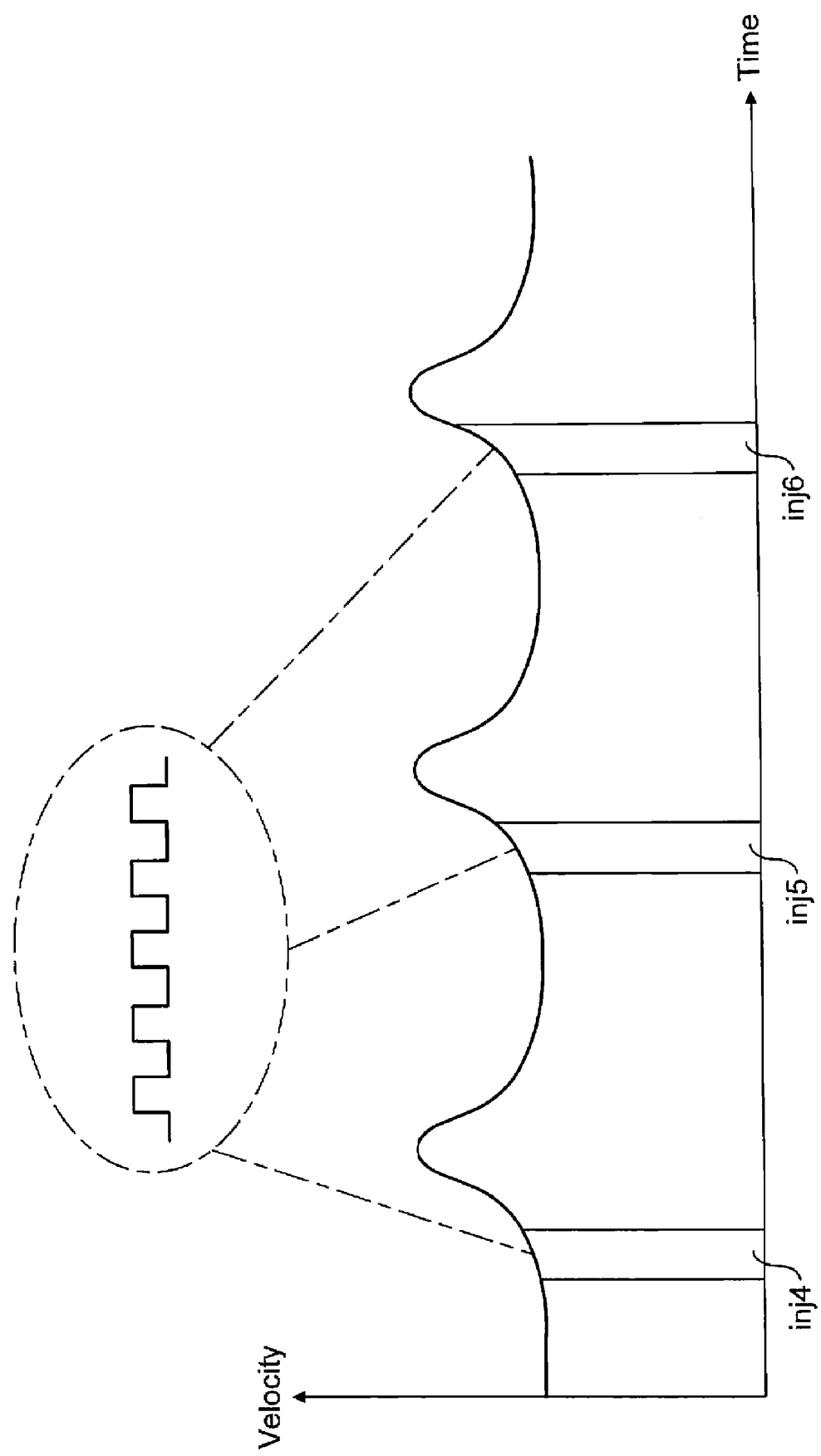
Figure 8:
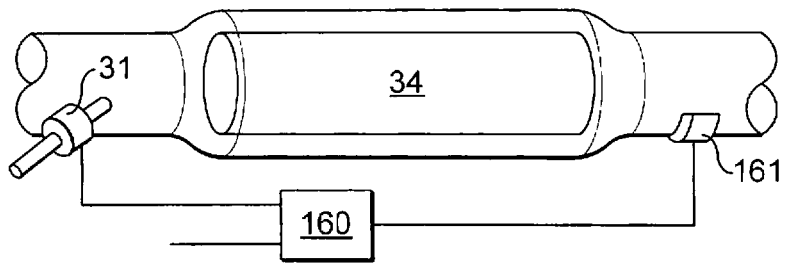
Figure 9:
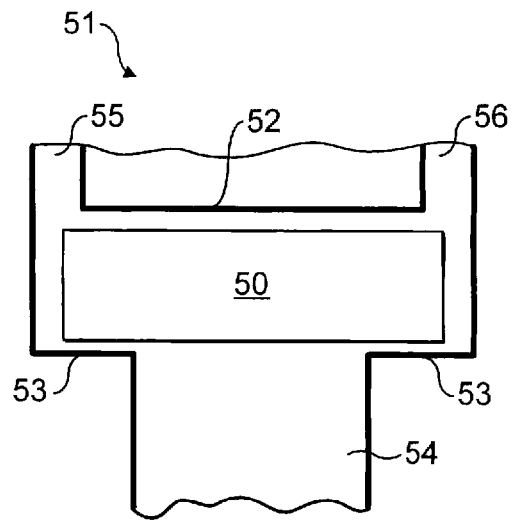
Figure 10:
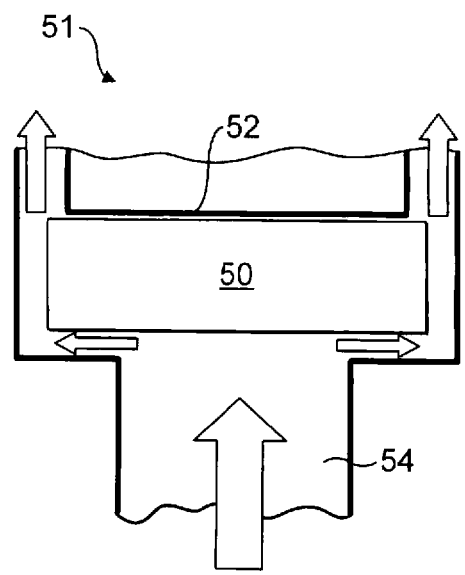
Figure 11:
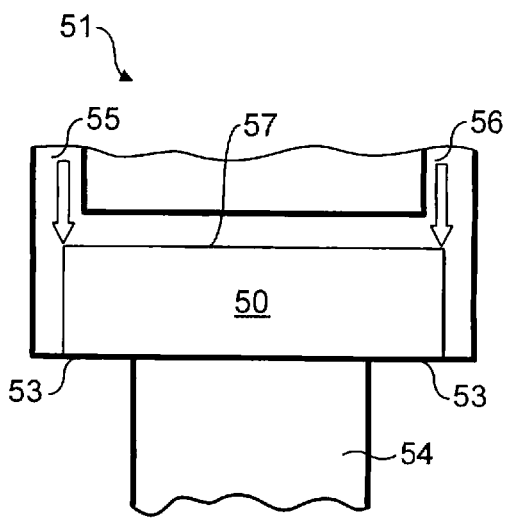
Figure 12:
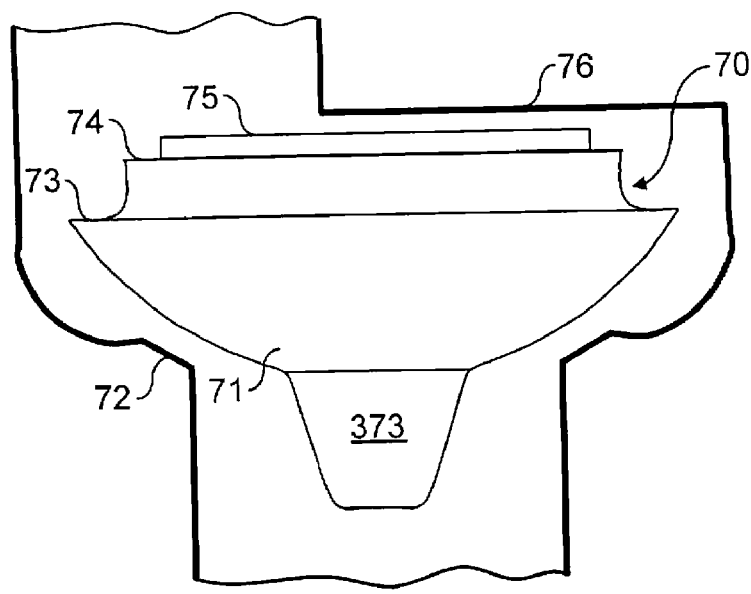
Figure 13:
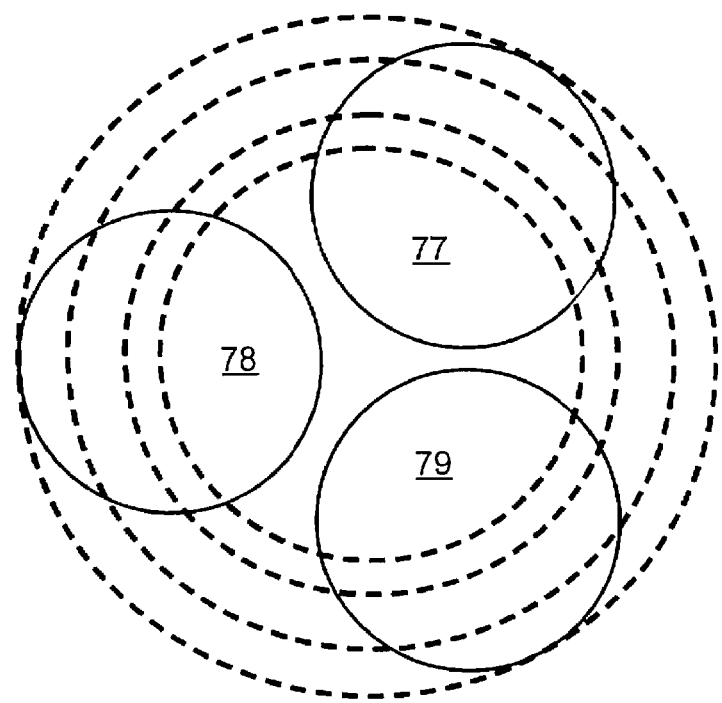
Figure 14:
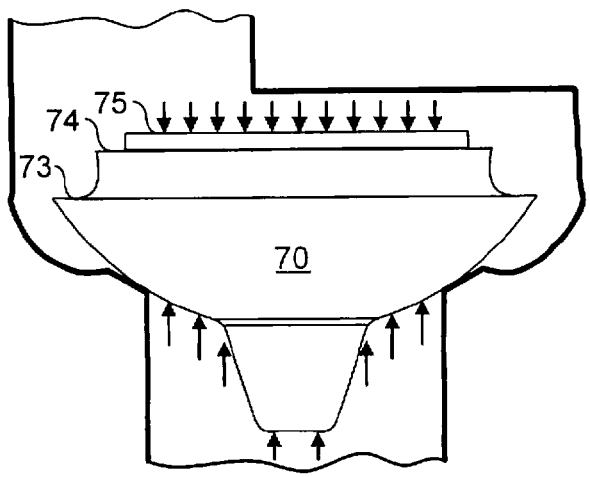
Figure 15:
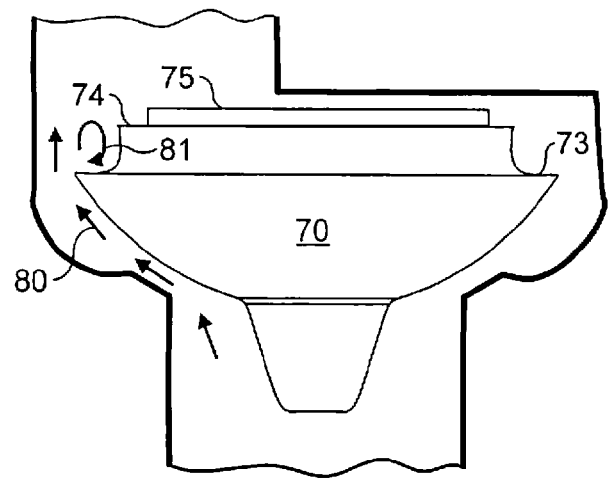
Figure 16:
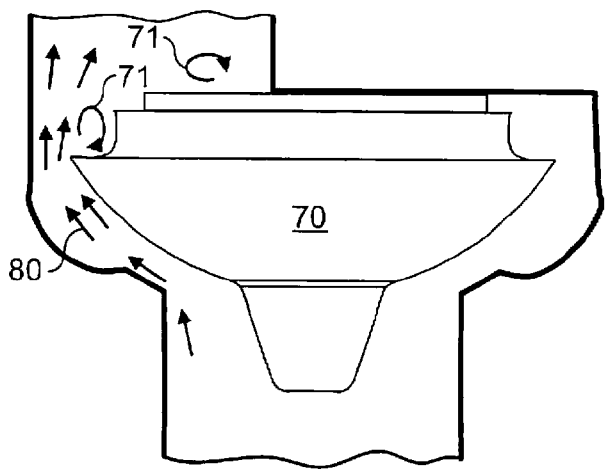
Figure 17:
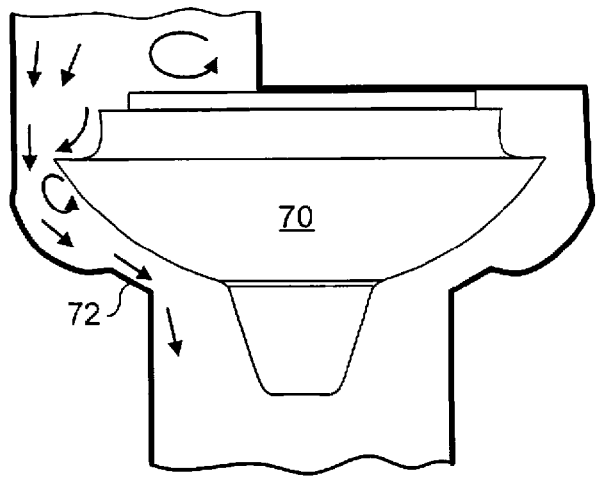
Figure 18:
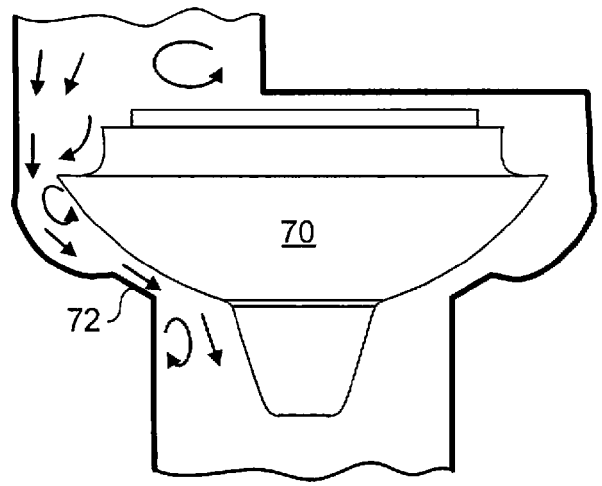
Figure 19:
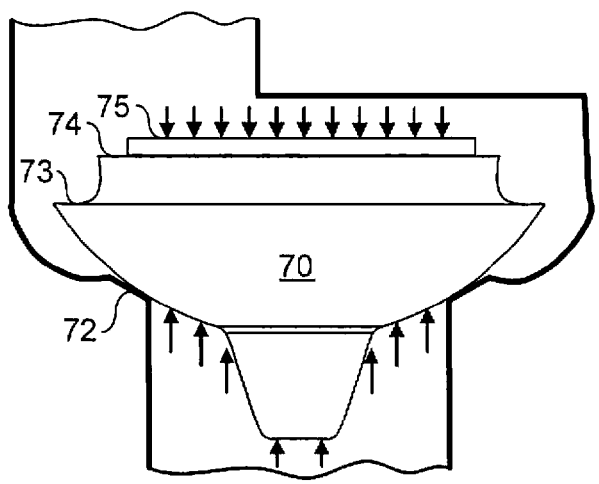
Figure 20:
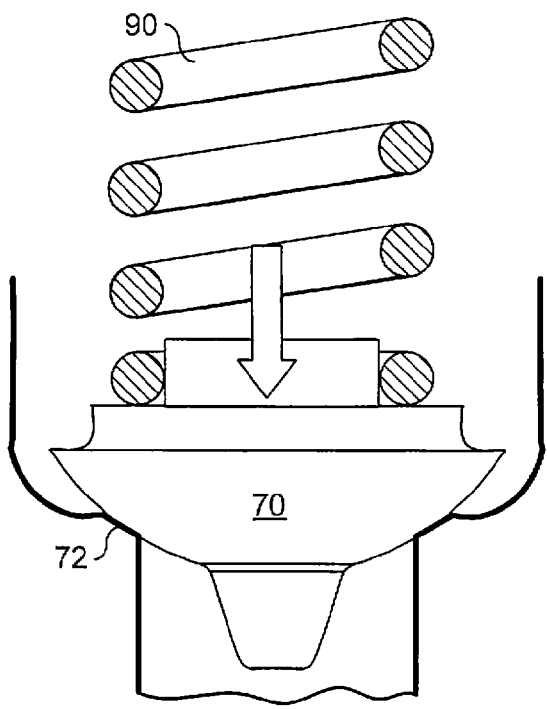
Figure 21:
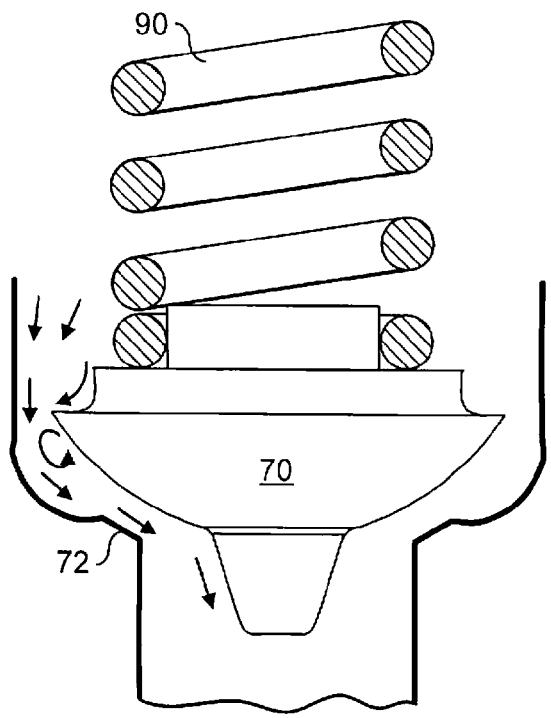
Figure 22:
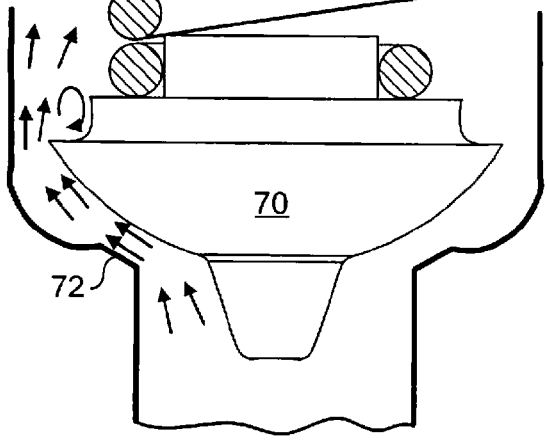
Figure 23:
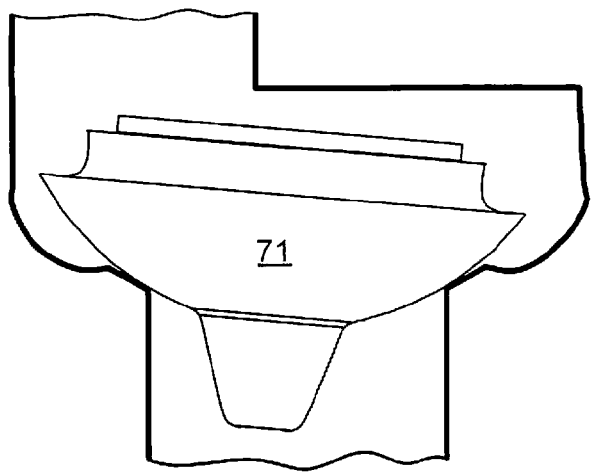
Figure 24:
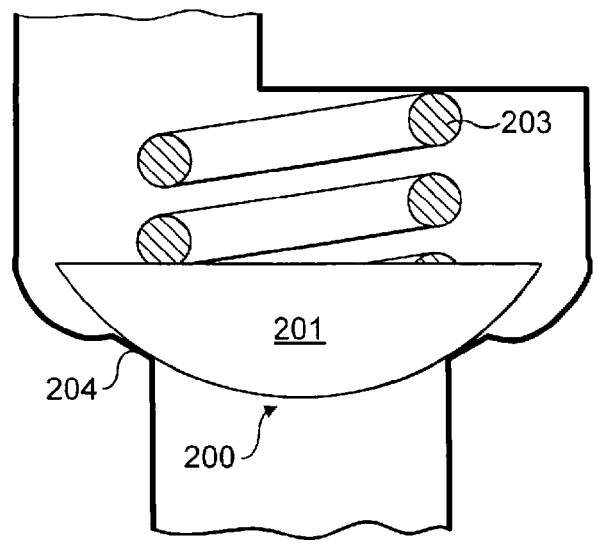
Figure 25:
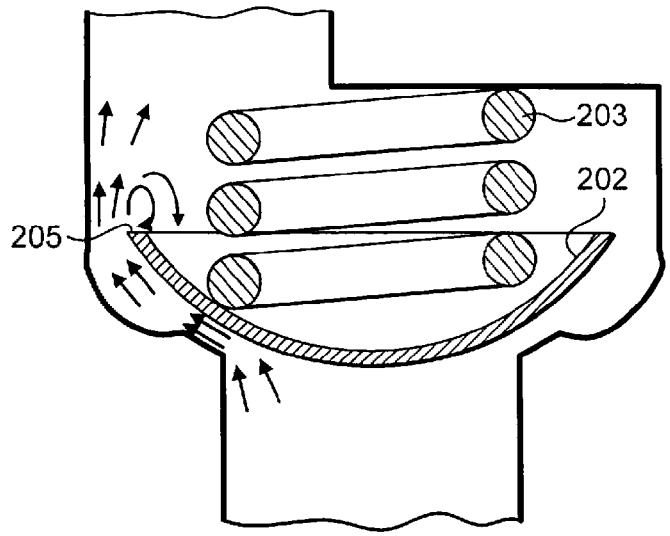

FIG. 3 graphically illustrates timing of lubricating oil delivery by the injector of FIG. 2;

FIG. 4 illustrates a revised configuration of piston suitable for the engine of FIG. 2;

FIG. 5 illustrates a second embodiment of internal combustion engine with the injector of FIG. 1 used to deliver lubricating oil;

FIG. 6 shows the FIG. 1 injector used to deliver urea solution into an exhaust system of a diesel engine;

FIG. 7a graphically illustrates timing of delivery of the urea solution in the FIG. 6 engine at low engine speeds;

FIG. 7b graphically illustrates timing of delivery of the urea solution in the FIG. 6 engine at high engine speeds;

FIG. 8 schematically illustrates a variant of the urea solution injection system which uses a feedback signal;

FIG. 9 shows an alternative inlet valve arrangement for the injector of FIG. 1;

FIG. 10 shows the FIG. 9 inlet valve in an open condition;

FIG. 11 shows the FIG. 9 inlet valve in a closed condition;

FIG. 12 shows a further alternative of inlet valve arrangement for the injector of FIG. 1;

FIG. 13 shows schematically outlet flow passages leading from the inlet valve of FIG. 12;

FIG. 14 shows the FIG. 12 inlet valve in a closed condition just prior to opening;

FIG. 15 shows the FIG. 12 inlet valve during opening;

FIG. 16 shows the FIG. 12 inlet valve in an open condition with fluid flowing past the valve to a variable volume chamber;

FIG. 17 shows the valve of FIG. 12 at the beginning of closing of the valve;

FIG. 18 shows a midpoint of closing of the FIG. 12; valve;

FIG. 19 shows the FIG. 12 valve when closed at the end of the closing operation;

FIG. 20 shows a further variant of inlet valve with the valve shown in a closed position;

FIG. 21 shows the FIG. 20 valve being closed from an open position to the closed position of FIG. 20;

FIG. 22 shows the FIG. 20 valve being opened from its closed position;

FIG. 23 shows how a movable element of the valve of any one of FIGS. 8 to 17 still seals even when not perfectly aligned;

FIG. 24 shows another variant of inlet valve for use with the FIG. 1 injector with the valve in a closed position;

FIG. 25 shows the FIG. 24 inlet valve in an open position; and

Figure 26:
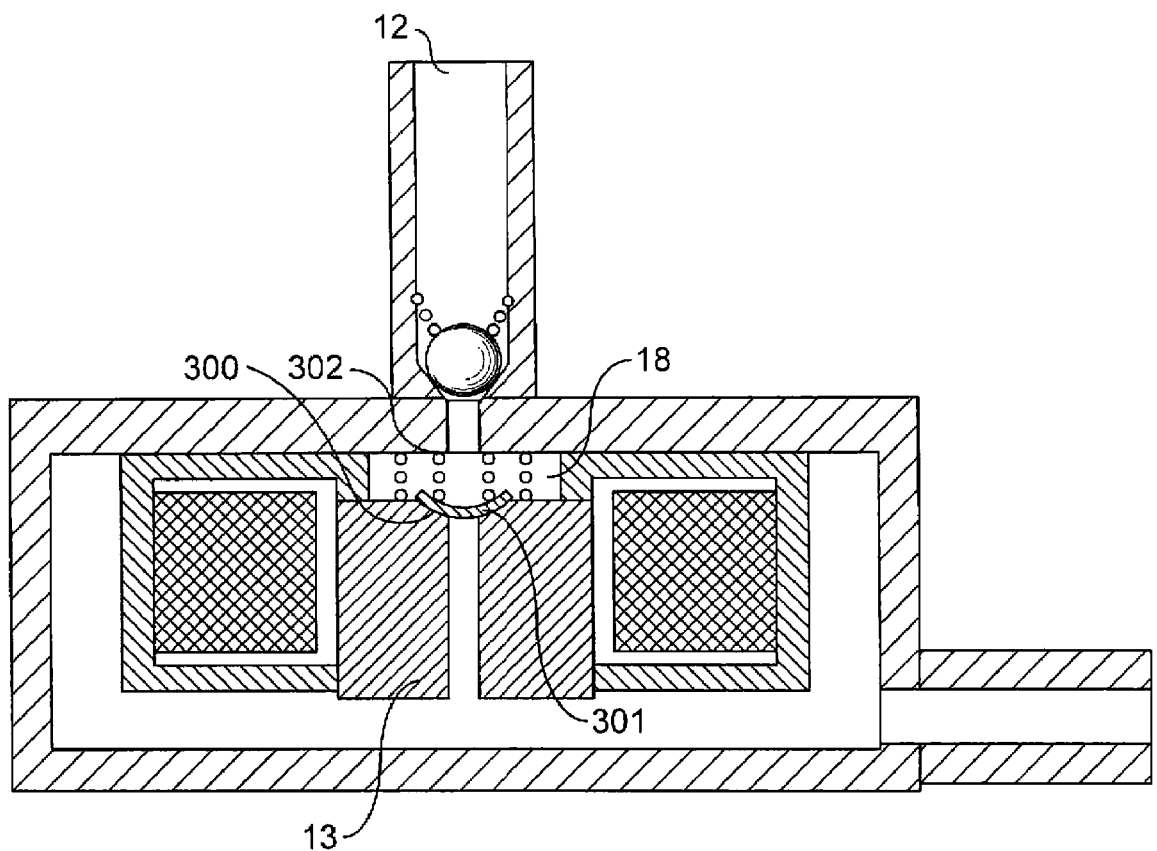

FIG. 26 shows a cross-sectional view through a variant of the injector of FIG. 1.

The applicant has realised that the pulse count injector ('PCI') 10 of FIG. 1, devised previously solely for the purpose of fuel injection, could be used in other applications, as now shown in FIGS. 2 and 3.

FIG. 2 shows the location of PCI injectors 22, 23, 24 on the crankshaft 20 and the cylinder bore 21 of a single-cylinder 2-stroke engine. The PCI injectors 22, 23, 24 are used not to deliver fuel, but instead lubrication oil from a storage tank 25.

In the past, small 2-stroke engines have typically operated a "total loss" lubrication method in which 2-stroke oil is mixed with fuel and air and burnt. The 2-stroke oil lubricates moving parts as it passes through the crankcase of the engine in which it is pressurized with fuel and air by the downward movement of the piston, to be delivered through a transfer port into the cylinder of the engine. This "total loss" lubrication system burns the lubricating oil in the cylinder and it is of benefit to keep the burnt oil to a minimum. The challenge has been to provide a low cost lubrication system which can be used in small 2-stroke engine without adding significant complexity to the engine.

In the FIG. 2 arrangement the injectors 22, 23, 24 all deliver lubrication oil at a precisely controlled rate depending upon engine speed, load and temperature. The delivery is controlled by an electronic control unit 26 which will receive signals indicative of engine speed, load and temperature. The lubrication oil is delivered exactly where needed in the engine, to the crankshaft 20 and in the cylinder bore 21. The lubrication rate is optimised for each part of the engine under all conditions, to maximise engine life and minimise excess oil to avoid excess emissions. The oil supply to the big end would be through internal passages in the crankshaft which are not shown, these passages being supplied by the crank main bearing PCI injectors.

Figure 2A:
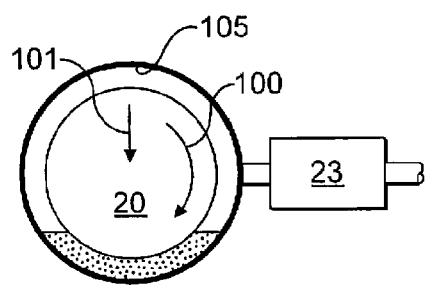
FIG. 2a is a schematic cross-section of a bearing of the engine of FIG. 2.
Figure 2B:
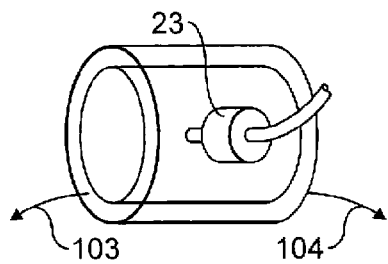

FIG. 2a shows how the lubricating oil delivered by the injector 23 is taken by the clockwise motion of the crankshaft 20 (indicated by arrow 100) down to the lower part of the bearing. The arrow 101 indicates the downward load applied to the crankshaft 20. The lubricating oil interposes itself between the outer surface of the crankshaft 20 and a facing annular surface 105 of the bearing. The oil eventually flows out from between the crankshaft and bearing surface, as shown in FIG. 2b by arrows 103, 104.

Ideally the shape of the engine's piston used in the engine will be modified to best suit the lubrication system; this is shown in FIG. 4. The piston 120 has a skirt with an extension portion 121 which extends downwardly from the main body of the piston. The connection of connecting rod 122 to the piston 120 is such that the piston will be forced against the right hand side (as shown in the Figure) of the cylinder and for this reason the injector 22 is located on this side to provide lubrication where needed most. Due to the use of the extension portion the injector 22 is aligned with the piston 120 for the majority of travel of the piston in each stroke. The piston has two piston rings: an upper 127 and a lower 128. The lower piston ring 128 acts as an oil control ring and scrapes off excess oil from the cylinder. A transfer port 129 opens onto the cylinder and pressurised charge air (or fuel/air mixture) is delivered to the cylinder via the transport port. An exhaust port 130 also opens onto the cylinder; it is higher (nearer the cylinder head) in the cylinder than the port 129. The upper piston ring is located such that in its stroke it travels just lower than the bottom of the transfer port 129. The lower piston ring 128 is located such that it never travels higher than the bottom of the transfer port 129 or exhaust port 130. The injector 22 is located further distant from a cylinder head of the cylinder than either the exhaust port 130 or transport port 129.

The injector 22 delivers oil onto the aligned piston surface so that it spreads out on the wall of the cylinder. The injector 22 only delivers oil when the injector is aligned with the piston skirt, including the skirt extension 121. Preferably the oil is injected in each engine cycle in a period starting with the first alignment of the piston skirt with the injector 22 during a downstroke of the piston. Thus, no oil is wastefully injected straight to the crankcase and oil is delivered on the thrust side wall of the cylinder, exactly where needed. The thrust of the piston on the thrust side of the cylinder is proportional to load on the piston and the amount of lubricating oil delivered in each cycle is varied with engine load. The injector is controlled to give 1 or 2 "pulses" of oil at low loads, with numbers of "pulses" increasing with increasing loads up to 4 or 6 "pulses" at high loads.

FIG. 5 shows how an internal combustion engine 140 could be modified to operate a total loss lubrication system using an injector according to the present invention. The engine 140 has a piston 141 connected by a connecting rod 142 to a crankshaft 143 rotatably mounted in a crankcase 144. Fuel and air is supplied to the engine by an inlet passage 145. A breather tube 146 connects the inlet passage 145 to the crankcase 144. A cylinder head inlet poppet valve 147 controls flow of charge into a combustion chamber 148 of the engine. A cylinder head exhaust poppet valve 150 controls flow of combusted gases from the combustion camber 138 to an exhaust passage 149.

An injector 151 of the type shown in FIG. 1 is mounted in a cylinder wall of the engine to deliver oil on the exterior of the piston 141 as described above. Oil delivered by the injector 151 will be scraped from the cylinder wall by piston rings on the piston and delivered to the crankcase 144 after it has served its lubricating purpose. Rotation of the crankshaft 143 in the crankcase 144 will cyclically draw fuel and air into and expel fuel and air from the crankcase via the breather tube 146. The fuel and air in the crankcase mixes with the lubricating oil and the mixture of fuel, oil and air is subsequently combusted in the combustion chamber 148.

The use of the injector 151 enables the amount of oil delivered in each engine cycle to be varied with engine load and to be delivered at the best time in the engine cycle to maximise lubrication. The injector 151 is itself a pump and so the engine does not require a separate oil pump. The injector 151 delivers oil just sufficient to meet the lubrication needs of the engine and so minimises the amount of oil burnt in the combustion chamber 148.

Although not shown in the Figures, an injector such as that shown in FIG. 1 can also be used to lubricate a camshaft used to drive an inlet valve or an exhaust valve. An injector could also be used to lubricate a tappet in such an engine.

FIG. 3 illustrates how the pressure on the facing surfaces of the crankshaft and bearing varies cyclically with time during engine operating cycles, the greatest pressure being created during combustion. The injector 23 (and the injector 24) will be controlled to deliver pulses of lubricating oil at the beginning of the periods during which there is a pressure increase. Between Od1 and Od2 the injector 23 is controlled to deliver two "pulses" of lubricating oil, by the control signal 107 shown in the Figure. This is for a first low maximum pressure $P_{max}$ at low engine loads. Between Od3 and Od4 the injector 23 is controlled to deliver three "pulses" of lubricating oil (i.e. a greater total amount of lubricating oil) by the control signal 106 shown in the Figure. This is for a second higher maximum pressure $P_{max2}$, at higher engine loads.

The injectors 23, 24 are used to synchronise delivery of lubricant to the bearings with times of maximum loading on the bearings. The injectors deliver oil to a low pressure area of the bearings so that the delivered oil is entrained into a gap between the crankshaft and the surrounding bearing and entrained downwardly to the high force area where it forms an oil film which is "squeezed" between crankshaft and bearing.

In previous engines oil delivery would have been continuous. The rate would be that needed to ensure an adequate oil flow for high load parts of the engine cycle, but would be excessive for low load parts of the cycle. The oil would be wasted and would flow out of the bearing needlessly. The present invention reduces waste oil by delivery in each engine cycle of the oil when needed and at a quantity appropriate for the loading on the bearing. The number of pulses may vary from one pulse at engine idle to six pulses at high loads.

The applicant has also realised that its injection unit can be used advantageously in a diesel engine to control the metering of and allow the delivery of urea solution onto the front face of a catalyst in a diesel exhaust system. This is shown in FIG. 6. The system 30 in FIG. 6 has an injector 31 connected to a urea solution storage tank 32 which delivers urea solution into an exhaust pipe 33 just upstream of a catalytic converter 34. Also in the figure there can be seen the diesel engine 35 with exhaust runners 36, 37, 38 and 39 connected to a manifold 40 from which the exhaust pipe 33 runs. An electronic controller 41 controls the operation of the injector unit 31. The delivery of urea solution allows optimisation of the diesel catalytic converter 34, by allowing use of a process known as selective catalytic reduction, which removes NOx from the exhaust gases. The difficulty faced so far has been to find a low cost injection system that can cope with the exhaust environment and deliver the urea solution in a well-dispersed pattern across the face of the catalyst. The injector of the present invention provides an ideal solution for this.

The injector 31 delivers urea solution in a method synchronised with operation of the internal combustion engine. FIG. 7a shows how, at the entry to the catalyst converter 35, velocity of exhaust gas varies over time. FIG. 7a shows a low engine speed situation and FIG. 7b shows a high engine speed situation; the maximum velocity is higher in FIG. 7a than in FIG. 7b and average velocity in FIG. 7a is higher than FIG. 7b. Variations in flow velocity increase as the catalytic converter 35 is located nearer the combustion chamber (which is sometimes preferred to assist catalyst operation).

The urea solution is injected into the exhaust gas flow as the flow velocity begins to increase so that the urea solution arrives at the catalyst with the greatest flow of combusted gases through the catalyst. The injection periods are shown as inj1, inj2 and inj3 in FIG. 7a and as inj4, inj5 and inj6 in FIG. 7b. For low engine speeds, there are three "pulses" or urea solution given in each injection period (see FIG. 7a). For increasing engine speeds the number of "pulses" are increased in each injection period up to five or six "pulses" for high speeds (see FIG. 7b).

The use of the injector 31 minimises urea solution consumption and delivers urea solution and gas at the same time to the catalyst in the correct mixture. Too much urea solution leads to "breakthrough" where the solution escapes through the catalyst. FIG. 8 shows an arrangement in which the injector 31 is controlled by an electronic controller 160 which controls operation of the injector 31 at least partly in dependence on a signal provided by a feedback sensor 161. The feedback sensor measures $NH_3$ in the exhaust gas and the controller 160 adjusts the amount of urea delivered accordingly. Additionally or alternatively, the heat of the gases leaving the catalytic converter 34 will be measured; the converter needs to be at above a certain temperature before urea decomposition takes place and the feedback of a temperature signal could be used to prevent delivery of urea solution until such a temperature is reached.

It can be seen in FIG. 8 that the injector 31 is angled to deliver urea solution on to the front face of the catalytic mass in the converter 34.

Whilst the delivery of urea solution is discussed above, an injector in the exhaust system could be used to detect other fluids as well. Delivery of fuel could be used to aid catalyst light-off in cold operating conditions or to keep the catalyst at an operating temperature while the engine is idling. Alternatively, if the catalyst is overheating for instance due to engine misfire, excess fuel could be delivered to the intake of the catalyst to cool the catalyst to prevent damage of the catalyst.

The injector 31 could also be arranged to deliver water to cool the catalyst to prevent overheating and damage to the catalyst. For instance, if an engine misfire is detected then the injector would be used to deliver cooling water to prevent dangerous overheating of the catalyst, increasing catalyst life and reducing fire hazards. It is particularly important to keep a catalyst cool when it is connected to an engine used for a power tool, e.g. a chainsaw which is operated in the presence of sawdust or a cutter used for hay or straw. Angle grinders face a particular problem since in use they quickly go from a full load grinding condition to a no load condition. Typically, the spark is cut off on a switch from full to no load and in a carburetted engine this means that a lot of fuel is delivered to any catalyst in the exhaust system, which will glow white hot. Injecting water would ameliorate this situation.

Whilst the FIG. 1 injector would function very well to provide delivery of lubricating oil in the FIG. 2 system or delivery of urea solution (or water or fuel) in the FIG. 3 system, the applicant has also considered modifications. In particular, the applicant has considered modifications of the one-way inlet valve 16 shown in FIG. 1. These will now be discussed.

In place of the ball valve of the inlet valve 16 of FIG. 1, a disc (flap) valve could be used in as shown in FIGS. 9, 10, and 11. The valve comprises a disc 50 provided within the piston 51 and moveable between stop faces 52 and 53. A fluid inlet channel 54 is shown as well as a pair of fluid outlet channels 55 and 56. The outlet channels 55 and 56 will lead to a variable volume chamber 18 (equivalent to the fuel chamber described above) from which lubricant will be dispensed by the piston via the one-way outlet valve.

The operation of the FIG. 9 valve is shown in FIGS. 10 and 11. As the piston 51 moves downwardly to increase the volume of the variable volume chamber 18 then fluid flow through the inlet channel 54 will force open the disc valve by forcing the disc 50 against the stop face 52. The fluid flow will be across the face of the disc 50 and then around the periphery of the disc 50 through fluid outlet channels such as 55 and 56. Assisting the opening of the valve will also be the inertia of the disc 50 which will tend to cause the disc 50 to move upwardly relative to the piston 51 as the piston 51 moves downwardly.

FIG. 11 shows the situation when the piston 51 moves upwardly and fluid tries to flow down the fluid outlet channels 55 and 56. The fluid will act on the rear surface 57 of the disc 50 to force the disc closed against the stop faces 53. Once again the inertia of the disc 50 will also aid this closing, because the disc 50 will move downwardly relative to the piston 51 as the piston 51 moves upwardly.

The disc shown in FIGS. 9, 10 and 11 is very simple in shape, but an improvement of the performance of the valve can be achieved by using a specially shaped valve member 70, as shown in FIGS. 12 through 23. In the description below the valve member will be described as having two faces, an inlet face which faces upstream in terms of fluid flow through the valve and an outlet face which faces downstream in terms of fluid flow through the valve.

In FIG. 12 the inlet face of the valve member 70 has a spherical (domed) sealing surface 71 which seals against a matching shaped seating surface 72 provided in the movable piston. The spherical shape ensures correct seating of the valve member 71 and good sealing. The spherical shape shown is preferred because it allows perfect sealing even when there is some misalignment of the valve element, as can be seen in FIG. 23. The smooth spherical face allows good smooth fluid flow through the sealing area and minimal flow restriction. Use of either a spherical shape or conical shape allows a small seat area which then gives a good contact pressure between valve element and seat when the valve is closed and thus a good positive seal. The seat 72 will preferably be of a matched spherical or conical shape or can be a low cost chamfer design.

A flow guide 373 protrudes from the sealing surface 71 in an upstream direction and improves fluid flow past the valve member 70. The flow guide 373 helps the fluid flow smoothly into and through the seat area when the valve is open, helping to reduce overall pressure drop on flow across the valve. The shape of the valve member 70 gives an optimum shaped gap between the circumferential edge of valve member 70 and the facing guide walls in the piston to reduce pressure loss during flow of fluid through the piston to the variable volume chamber and to maximise fluid flow resistance when the fluid flow reverses direction and thereby ensure rapid valve closure. The gap is set to give a compromise between a rapid closing of the valve and a low pressure drop when the valve is open. Typically, the gap is 1/10 of the maximum diameter of the valve element, typically the valve element diameter will be 1.5 mm to 2.00 mm and the gap 0.15 to 0.20 mm.

The valve member 70 has two sharp circular edges 73 and 74 which interrupt fluid flow past the valve member 70 when the flow is from outlet to inlet to thereby generate a high closing force and fast valve closing.

During the valve opening sequence, as seen in FIGS. 14 to 16, as a pressure difference across the valve element 20 is generated, the valve opens and fluid flows. The sharp edges 73, 74 induce a high turbulence around the outlet face 75 of the valve element 71 (see FIG. 15) which increases the pressure differential across the valve and assists rapid valve opening. The speed of opening is also improved by a low mass of the valve element 70 (when compared to traditional ball-shaped valve element, the valve element 71 being just over half the mass of the equivalent diameter ball). The absence of any biasing spring force also assists fast opening. When the valve element 70 is in its fully open condition (FIG. 16) then the turbulent flow ensures that a pressure drop is maintained across the valve element 70 and the valve element 70 is kept full open.

A land 75 stands proud on the outlet face of the valve member 70 to minimise sticking of the valve member 70 to a facing stop face 76 defined in the piston. The piston is designed with three outlets 77, 78 and 79 leading to the variable volume chamber, as can be seen in FIG. 13. This maximises flow area and also reduces contact area with the outlet side of the valve member 70.

The land 75 gives a fixed open condition to the valve element and provides the upstream point of contact between the valve element 70 and the surrounding valve chamber and thus prevents wear of the sharp edges 73, 74 of the valve element. The contact area between the valve element 70 and the valve chamber in the closed condition is kept to a minimum in order to ensure quick opening of the valve element; a large area would lead to a "sticking" effect and delay valve closing. Nevertheless the contact area should be sufficient to ensure that the valve element 70 is in correct alignment when fully open; this needs points of contact spaced from the central axis of the valve element 70. The use of three outlet ducts 77, 78, 79 (see FIG. 13) symmetrically located about the valve element axis provides a contact area of an appropriate shape while focusing fluid flow during valve opening on the sharp edges 73, 74.

FIG. 14 shows the valve member 70 in its closed position just prior to opening; the arrows indicate the fluid pressure on the inlet and outlet faces of the valve member 70, the smaller arrows acting on the outlet face show that the pressure is less than that on the inlet face, which is indicated by the larger arrows. The fluid pressure differential lifts the valve member 70 off its valve seat to allow fluid flow past the valve member 70 as shown by the arrows in FIG. 15. Eventually the land 75 on the outlet side of valve member 70 abuts the facing stop face of the valve chamber on the piston as shown in FIG. 16, with good fluid flow around the valve member 70 as indicated by arrows 80, with small recirculating eddy currents 81 acting on the outlet side of the valve member 70 smoothing the main bulk flow of the fluid into the variable volume chamber and also providing a small low pressure area on the downstroke side of the valve to ensure the valve remains fully open.

Closing of the valve is illustrated in FIGS. 17, 18 and 19. In FIG. 17 fluid flow has started to reverse, which lifts the valve member 70 away from its end stop, as shown in FIG. 18; the fluid flow is shown by the arrows. In FIG. 19 the valve member 70 is closed fully with the pressure on the outlet face larger than the pressure on the inlet face (as indicated by the relative size of the arrows).

During the closing sequence of FIGS. 17, 18, 19 the sharp edges 73, 74 introduce a high degree of turbulence in the fluid flow (see FIG. 18) and a large degree of resistance to flow of fluid through the gap between the valve element and the valve chamber. With flow in this valve closing direction, the resistance to flow generates a high pressure drop across the valve element 70, which shuts the valve quickly. As the valve element 70 continues towards the valve seat 72 the smooth flow of fluid between the valve seat 72 and the spherical surface increases velocity of the fluid flow and this high velocity flow produces a region of reduced pressure which aids rapid closing of the valve. The valve element 70 on engaging the seat 72 is kept engaged with the seat 72 by the pressure difference across it; see FIG. 19, where the large areas on the downstream side indicate a larger force on this side than the force on the upstream side, the reduced force being indicated by the smaller arrows.

The design features described above enable the check valve to operate at a high frequency. The design allows the valve's response to a change of fluid flow direction to be very rapid which also ensures a low pressure drop across the valve when the valve is open. The value is designed to operate at frequencies in the range 1000 Hz to 5000 Hz. Conventional check valves comprising an arrangement of ball and spring are limited to low frequency operation because the mass of the ball reduces the valve's natural frequency. Also the flow of fluid around the ball is smooth and thus the flow tends to cause the ball and spring to oscillate when the valve is in the open condition, which leads to a restriction in fluid flow. The smooth flow produces only a small resultant force across the ball as a result of fluid flow; thus the ball closing is driven mainly by the spring. The need for choice of the spring to achieve an adequate closing force means that a large pressure drop across the ball is needed to open the valve, leading to a slow opening.

The disc valve of FIGS. 9, 10 and 11 has a quicker response than a ball and spring valve, due to a lower mass and a restrictive flow path during valve closing. However, in the open condition of the valve there is a significant pressure drop across the valve resulting from a restricted fluid flow.

The valve 70 can be biased closed by a valve spring 90 as illustrated in FIGS. 20 to 22. The operation of the valve is as described above, but the spring 90 assists valve closing and also ensures that the valve remains closed in the absence of fluid pressure (see FIG. 20). The spring slows valve opening, but the sharp edges still function as described above to aid closing. Also, the mass of the valve element is less than a comparable ball and this aids valve response. The turbulence upstream of the valve element ensures the valve element remains in its fully open condition and does not oscillate as is well known for a ball and spring valve in a fully open condition.

In the check valve of FIGS. 12 to 23, the flow guide feature could be of many different shapes and its point could be sharp or radius. Use of the flow guide feature will assist the valve elements' manufacture by an injection moulding process because the flow around the valve guide is not critical and the valve guide can provide the point at which plastic material is injected into a mould. The valve element is preferably injection moulded plastic, but it could be made of metal.

Whilst in FIGS. 12 to 23 there is a land 75 provided, this is not a critical feature and could be dispensed with.

FIGS. 24 and 25 show a simplified version of a check valve 200 used in the injector of FIG. 1. The check valve shown has many of the advantages of the check valve of FIGS. 10 to 23, but will be easier to produce and also will be lighter in mass, which aids frequency response. The check valve 200 comprises a dish-shaped disc with a convex spherical inlet face 201. The disc 200 also has a concave hemispherical outlet face 202, which is engaged by a valve spring 203. The inlet face 201 of the disc engages a matched seating surface 204 to close the valve. As seen in FIG. 25, flow around the surface 201 is smooth when the valve is open, but the sharp edge 205 at the extreme diameter of the valve element 200 causes turbulent flow, which assists in creating a pressure differential across the disc 200 and therefore assists opening of the valve. In common with the previous check valve described, the check valve of FIGS. 24 and 25 has both the features essential for rapid response, namely a domed upstream inlet face and a sharp edge to cause turbulent flow. The check valve of FIGS. 24 and 25 would be cheaper and easier to manufacture than the previous check valve described.

Moving on to FIG. 26, this Figure shows that the check valve of FIGS. 24 and 25 need not be disposed within a valve chamber within the piston 13, but instead could seal against a seat 300 provided on the upper surface of the piston 13, i.e. the downstream facing surface. In the Figure the valve element 301 is biased against the seat 300 by a valve spring 302 which acts between the valve element 301 and the surface of the variable volume chamber 18. This arrangement will be easier to manufacture than the arrangements described previously because there will be no need to form a valve chamber in the centre of the piston 13. However, whilst the shape of the valve element does give a quick valve movement and a good frequency response, the piston motion is not used to best advantage with this arrangement and the location of a valve in a valve chamber in the piston is preferred. Furthermore, the use of a valve spring 302 is essential in this arrangement, whereas it can be dispensed with in the check valve of FIGS. 10 to 22. Although a dish-shaped check valve element 301 is shown in FIG. 26, the specially shaped valve elements of FIGS. 12 to 22 could be used instead.

The invention claimed is:

1. An internal combustion engine having a lubrication system which comprises:
    a reservoir of lubricant;
    an injector which functions as a positive displacement pump, which is connected to the reservoir of lubricant and which dispenses an amount of lubricant which is fixed for each and every operation of the injector; and
    an electronic controller which controls operation of the injector; wherein:
    the controller controls delivery of lubricant by the injector and controls how many times the injector dispenses lubricant in each engine cycle and timing of delivery of lubricant in each engine cycle of the injector, the controller increasing in number the operations per cycle of the injector with increasing engine speed and/or load and the controller decreasing in number the operations per cycle of the injector with decreasing engine speed and/or load so as to reduce lubricant waste as compared to conventional engines.

2. An internal combustion engine as claimed in claim 1 wherein the engine has a plurality of engine components which require lubrication; the lubrication system comprises a plurality of injectors each associated with a respective one of the plurality of engine components, each injector functioning as a positive displacement pump, each injector connected to the reservoir of lubricant and each injector dispensing an amount of lubricant which is fixed for each and every operation of the injector; and the electronic controller controls the number of and timing of operations of each injector in each engine cycle independently of the other injector(s).

3. An internal combustion engine as claimed in claim 2 wherein the plurality of engine components include a camshaft.

4. An internal combustion engine as claimed in claim 2 wherein the plurality of engine components include camshaft bearings.

5. An internal combustion engine as claimed in claim 2 wherein the plurality of engine components include tappets.

6. An internal combustion engine as claimed in any one of claim 2 where the plurality of engine components include crankshaft bearings.

7. An internal combustion engine as claimed in claim 1 wherein the injector comprises:
    a housing in which a variable volume chamber is formed;
    an electrical coil;
    a piston which slides axially in a bore in the housing under the action of the electrical coil;
    a one-way inlet valve which allows flow of fluid into the variable volume chamber from a fluid inlet; and
    a one-way outlet valve which allows flow of fluid out of the variable volume chamber to a fluid outlet; wherein:
    the inlet valve is located within a valve chamber provided in the piston and controls flow of fluid through a piston passage passing through the piston;
    the inlet valve has a movable element slidable along an axis in the valve chamber;
    the piston passage has an inlet duct which delivers fluid to the valve chamber and a plurality of output ducts which deliver fluid from the chamber;
    the movable element of the inlet valve has a domed or conical inlet face facing the inlet duct, an outlet face facing the outlet duct and a sharp edge for inducing turbulence in fluid flow past the movable element; and
    fluid flowing from the inlet duct to the outlet duct must flow across the domed or conical inlet face of the movable element and past the sharp edge of the movable element.

8. An internal combustion engine comprising:
a piston reciprocating in a cylinder;
a crankshaft journalled in bearings;
a connecting rod connecting the piston to the crankshaft; and
a lubrication system for lubricating the bearings which comprises:
a reservoir of lubricant;
an injector which functions as a positive displacement pump, which is connected to the reservoir of lubricant and which dispenses an amount of lubricant which is fixed for each and every operation of the injector; and
an electronic controller which controls operation of the injector; wherein:
the controller controls delivery of lubricant by the injector and controls how many times the injector dispenses lubricant in each engine cycle and timing of delivery of lubricant in each engine cycle of the injector, the controller increasing in number the operations per cycle of the injector with increasing engine speed and/or load and the controller decreasing in number the operations per cycle of the injector with decreasing engine speed and/or load so as to reduce lubricant waste as compared to conventional engines.

9. An internal combustion engine as claimed in claim 8 wherein: the lubrication system comprises a plurality of injectors each associated with one of the crankshaft bearings, each injector functioning as a positive displacement pump, each injector connected to the reservoir of lubricant and each injector dispensing an amount of lubricant which is fixed for each and every operation of the injector; and the electronic controller controls the number of and timing of operations of each injector in each engine cycle independently of the other injector(s).

10. An internal combustion engine as claimed in claim 9 wherein loading on each bearing varies cyclically during operation of the engine and each injector is controlled to deliver lubricant as the loading on a respective bearing is increasing and to remain inactive during a period of low loading on the bearing.

11. An internal combustion engine as claimed in claim 10 wherein in each bearing the crankshaft is surrounded by an annular bearing surface which has a thrust surface portion which reacts thrust on the crankshaft and each injector is located to inject lubricant at a point on the annular surface other than the thrust surface portion and rotation of the crankshaft entrains injected lubricant to the thrust surface portion.

12. An internal combustion engine as claimed in claim 8 wherein a cylinder wall injector is provided to lubricate a wall of the cylinder, the cylinder wall injector being connected to the reservoir of lubricant and the injector dispensing an amount of lubricant which is fixed for each and every operation of the injector; and the electronic controller controls in number the operations of the cylinder wall injector in each engine cycle and also timing of the injections in each engine cycle, the cylinder wall injector being controlled independently of the other injector(s), and the controller increasing in number the operations of the cylinder wall injector per engine cycle with increasing engine speed and/or load and decreasing in number the operations of the cylinder wall injector per engine cycle with decreasing engine speed and/or load.

13. An internal combustion engine as claimed in claim 12 wherein:
the engine is a two-stroke engine in which fuel and air charge is delivered to the cylinder via one or more transfer port(s) in the cylinder wall and combusted gases are exhausted from the cylinder via an exhaust port in the cylinder wall, the exhaust port and the transfer port(s) being located each in opposed surface portions of the cylinder wall and the exhaust port being located nearer a cylinder head of the cylinder than the transfer port; and
the cylinder wall injector is positioned to deliver lubricant at a position in the cylinder wall further away from the cylinder head than the transport port and on a side of the cylinder wall against which the piston is forced during combustion.

14. An internal combustion engine as claimed in claim 13 wherein the crankshaft rotates in a crankcase and lubricant injected by the cylinder wall injector is mixed with fuel/air charge in the crankcase and the mixture of fuel, air and lubricant is combusted in the cylinder.

15. An internal combustion engine as claimed in claim 12 wherein:
the cylinder has a cylinder head with an inlet port via which fuel and air charge is delivered to the cylinder and an inlet valve is provided to open and close the inlet port;
fuel and air charge is delivered to the inlet port via an inlet passage;
the inlet passage is connected by a breather passage to a crankcase in which the crankshaft rotates;
fuel and air charge is cyclically drawn into and expelled from the crankcase;
the fuel and air charge in the crankcase mixes with injected lubricant; and
the mixture of fuel, air and lubricant is combusted in the cylinder.

16. An internal combustion engine as claimed in claim 12 wherein the piston has a piston skirt and a skirt extension portion which extends away from the cylinder head to lengthen the piston skirt in the region of the injector to allow for an increased duration of alignment of the piston skirt with the cylinder wall injector.

17. An internal combustion engine as claimed in claim 16 wherein the controller controls operation of the injector so that lubricant is dispensed only when the cylinder wall injector is aligned with the piston skirt, including the skirt extension portion.

18. An internal combustion engine comprising:
a piston reciprocating in a cylinder;
a connecting rod connecting the piston to the crankshaft; and
a lubrication system for lubricating a wall of the cylinder which comprises:
a reservoir of lubricant;
an injector which lubricates a wall of the cylinder, which functions as a positive displacement pump, which is connected to the reservoir of lubricant and which dispenses an amount of lubricant which is fixed for each and every operation of the injector; and
an electronic controller which controls operation of the injector; wherein:
the controller controls how many times the injector dispenses lubricant in each engine cycle and also timing of delivery of lubricant by the injector, the controller increasing in number the operations of the injector per engine cycle with increasing engine speed and/or load and the controller decreasing in number the operations of the injector per engine cycle with decreasing engine speed and/or load so as to reduce lubricant waste as compared to conventional engines.

19. An internal combustion engine as claimed in claim 18 wherein:
the engine is a two-stroke engine in which fuel and air charge is delivered to the cylinder via one or more transfer ports) in the cylinder wall and combusted gases are exhausted from the cylinder via an exhaust port in the cylinder wall, the exhaust port and the transfer port(s) being located each in opposed surfaces portions of the cylinder wall and the exhaust port being located nearer a cylinder head of the cylinder than the transfer port; and the injector is positioned to deliver lubricant at a position in the cylinder wall further away from the cylinder head than the transfer port and on a side of the cylinder wall against which the piston is forced during combustion.

20. An internal combustion engine as claimed in claim 19 wherein the crankshaft rotates in a crankcase and lubricant injected by the cylinder wall injector is mixed with fuel/air charge in the crankcase and then the mixture of fuel, air and lubricant is combusted in the cylinder.

21. An internal combustion engine as claimed in claim 18 wherein:

the cylinder has a cylinder head with an inlet port via which fuel and air charge is delivered to the cylinder;

an inlet valve is provided to open and close the inlet port;

fuel and air charge is delivered to the inlet port via an inlet passage;

the inlet passage is connected by a breather passage to a crankcase in which the crankshaft rotates;

fuel and air charge is cyclically drawn into and expelled from the crankcase;

the fuel and air charge in the crankcase mixes with injected lubricant; and the mixture of fuel, air and lubricant is combusted in the cylinder.

22. An internal combustion engine as claimed in claim 18 wherein the piston has a piston skirt and a skirt extension portion which extends away from the cylinder head to lengthen the piston skirt in the region of the injector to allow for an increased duration of alignment of the piston skirt with the injector.

23. An internal combustion engine as claimed in claim 22 wherein the controller controls operation of the injector so that lubricant is dispensed only when the injector is aligned with the piston skirt, including the skirt extension portion.

* * * * *